UNITED STATES PATENT OFFICE.

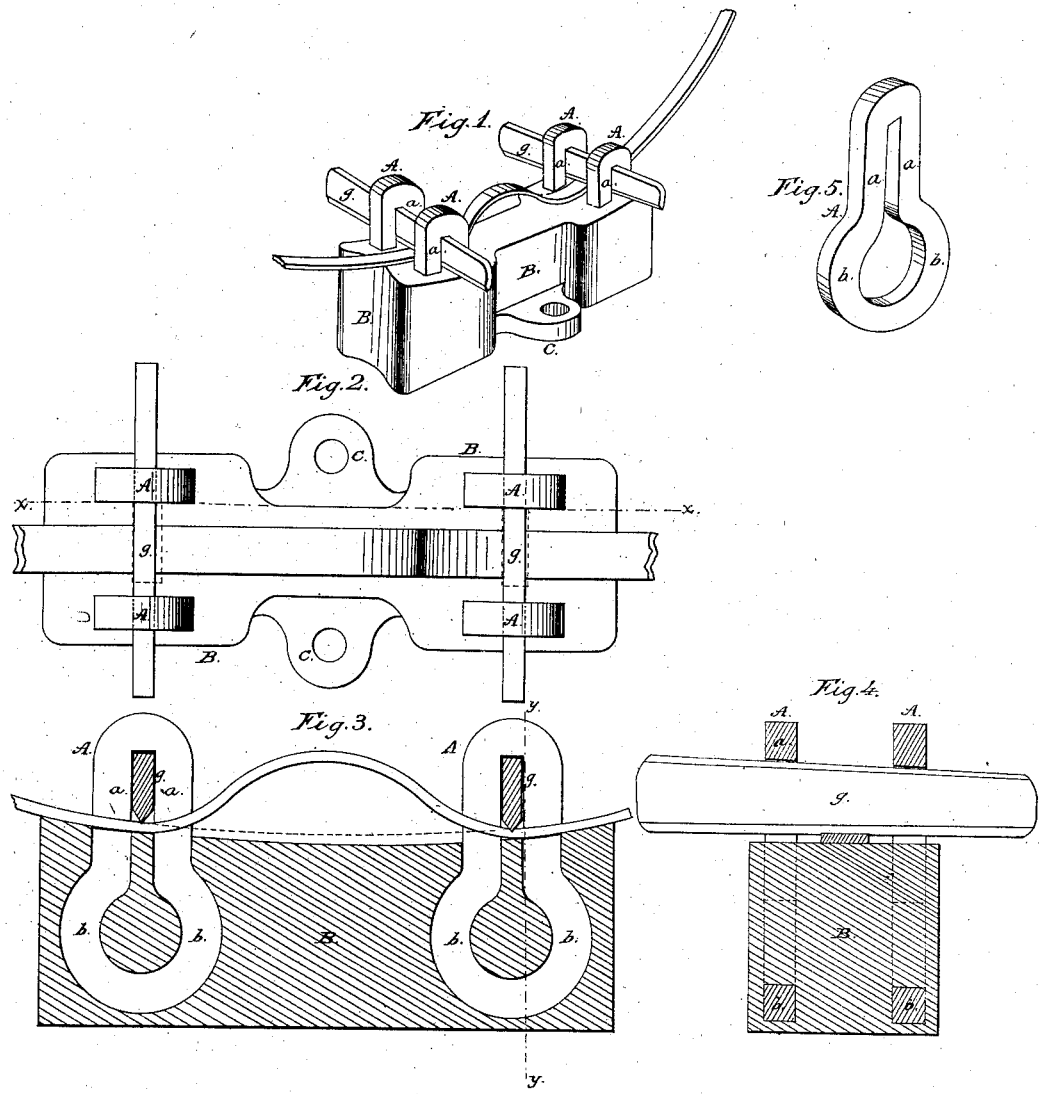

L. A. DOLE, OF SALEM, OHIO, ASSIGNOR TO HIMSELF AND A. R. SILVER.

IMPROVEMENT IN TIRE-UPSETTING MACHINES.

Specification forming part of Letters Patent No. 41,257, dated January 12, 1864.

*To all whom it may concern:*

Be it known that I, L. A. DOLE, of Salem, county of Columbiana, State of Ohio, have invented a new and Improved Machine for Upsetting Tires; and I do hereby declare that the following is a full, clear, and exact description thereof, reference being had to the accompanying drawings, making a part of this specification, in which—

Figure 1 is a perspective view of my improved machine, showing the manner of confining the tire therein. Fig. 2 is a top view of Fig. 1. Fig. 3 is a section through Fig. 2, taken in the vertical plane indicated by the course of red line $x\ x$. Fig. 4 is a transverse section through the machine, taken in the vertical plane indicated by red line $y\ y$, Fig. 3. Fig. 5 is a perspective view of one of the key-retainers.

Similar letters of reference indicate corresponding parts in the several figures.

This invention is an improvement on that class of tire "upsetting" or "shrinking" machines wherein the tire is confined in place on an anvil by means of wedges or keys, which bite and hold the tire and prevent it from slipping during the operation of upsetting the metal.

The object of my invention is to combine wrought-metal key-retainers, which are adapted for receiving keys for confining the tire in place on the anvil, with a cast-metal anvil in such manner that the looped portions of said key-retainers shall be embedded in the body of the anvil, and by this means secured rigidly and permanently in place, thereby obtaining the advantage of a cheap cast-metal anvil, with key-retaining loops which possess greater tenacity and capability of withstanding the concussions to which they are subjected than the metal of which the anvil is composed, as will be hereinafter described.

To enable others skilled in the art to make and use my invention, I will proceed to describe its construction and operation.

In Figs. 3 and 5 of the accompanying drawings I have represented the key-retainers A A A A, which are constructed by bending a wrought-metal bar in the shape represented in said figures, and then welding the two ends of the bar together. This form gives a slotted contracted portion, $a$, for receiving the keys, enlarged at its lower end into an open circular portion, $b$. Four of these key-retainers A are set up in a suitable mold, so that they will occupy the relative positions represented in Figs. 1 and 2, and cast metal is poured into the mold, so as to completely envelop the lower or circular portions, $b$, of these key-retainers, and thus to form an anvil, B, in which the retainers are embedded, as represented in the sectional Figs. 3 and 4. The mold or matrix is formed so as to produce an anvil having a longitudinally-concave upper face adapted for receiving the circular tires, and also eye-lugs $c\ c$, for receiving bolts, which are used to confine the machine down on a suitable bed. I thus obtain the strength of a solid wrought-metal anvil having key-retainers formed of one homogeneous piece, while I obtain the additional advantage of having the body of the machine or anvil composed of a metal which, while it does not possess the strength or tenacity required for the key-retainers, will answer every purpose as an anvil when wrought-metal loops or key-retainers are combined with it in the manner above described. The four wrought-metal key-retainers A are arranged in pairs, so that each pair will receive through them a key, $g$, which passes transversely across the anvil B, and confines the tire down on the surface thereof, as will be hereinafter described. Between each pair of key-retainers a space is left of sufficient width to receive the widest tire, for the purpose of allowing the wedge-keys to press it down upon the face of the anvil, and to hold it rigidly thereon. These keys should be made of steel, having their narrow edges tapering from one end to the other, and one of these edges should be beveled, so as to form a V edge for biting into the metal of the tire, and thus holding it more firmly in place on the anvil.

The method of shrinking a tire with my improved machine is first to form a bend (projecting inward) in the tire at any suitable point, as shown clearly in Figs. 1 and 3. The tire is then put between each pair of key-retainers A, so that the bend or kink will be at an intermediate point between these retainers, through which latter the wedge-keys are now passed and driven up hard, thus securing the tire down on the face of the anvil on each side of the bend in the tire, so that it cannot slip in either direction. It is only required now to hammer the bend in the tire down on the anvil, and thus crowd it into a shorter space. The keys being driven out, the tire can be removed, and the machine is ready for receiving another.

There is a great advantage in the use of key receiving and retaining loops which project from the face of the anvil, as I have above described, for it will be seen that with such projections the tire can be secured in place flatwise on the anvil by means of keys passing over and pressing down on the inside surface of the tire. The keys will thus act upon a much greater surface than where they are employed for gripping the edges of the tire, as in the patent of Leonard Kyle, numbered 27,813—an advantage which will be appreciated when it is understood that tires only vary about the half of an inch in thickness, while they vary three inches in width. This and other advantages derived from confining the tire by means of keys passing through loops, as above described, makes it desirable to employ these loops, which can only be done practically by making them of a very tenacious metal which will withstand the shocks and concussions of driving the wedges sufficiently tight to make them serve their purpose.

By my invention I am enabled still to use a cheap cast-metal anvil, and to obtain all the required strength of key-retainers, thus making available and useful an article which would be thrown aside as useless if made wholly of a cast or brittle metal.

Having thus described my invention, what I claim as new, and desire to secure by Letters Patent, is—

1. Making the wrought-metal key-retainers of the tire-upsetting machine with a contracted slotted portion, $a$, terminating in an enlarged eye, $b$, substantially as and for the purposes described.

2. The use of transverse wedge-keys with V edges, in combination with the wrought-metal loops A, applied to the anvil B, substantially as described.

L. A. DOLE.

Witnesses:
R. H. GARRIGUES,
V. N. REAPER.